Nov. 23, 1965 P. T. KAESTNER 3,218,913
METHOD AND APPARATUS FOR ELECTRO-OPTICALLY
ALIGNING A REMOTE OBJECT
Filed June 10, 1960 3 Sheets-Sheet 1
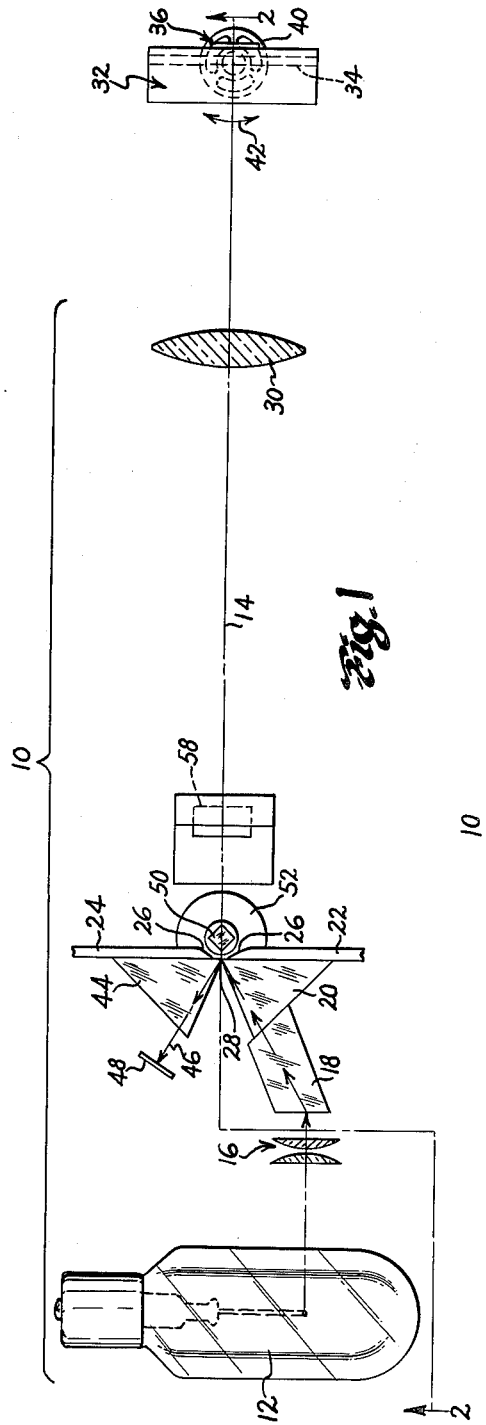
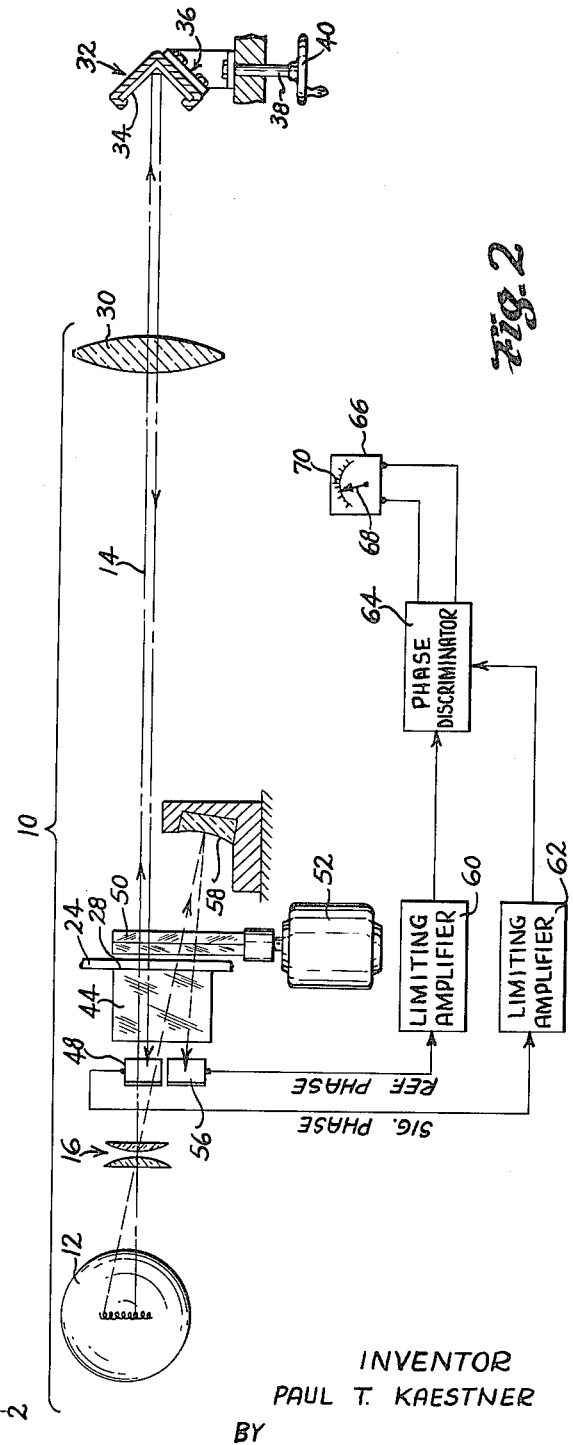
INVENTOR
PAUL T. KAESTNER
BY
*Louis L. Gagnon*
ATTORNEY

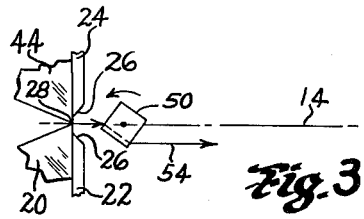
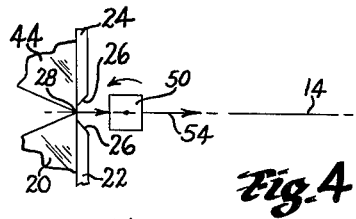
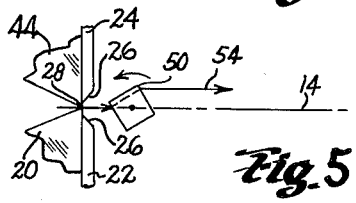
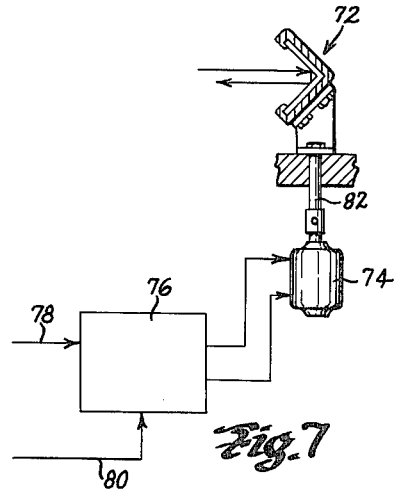
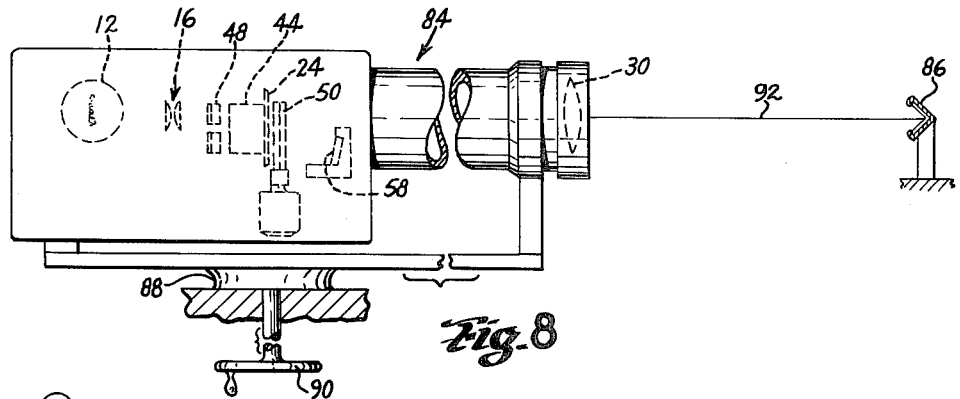
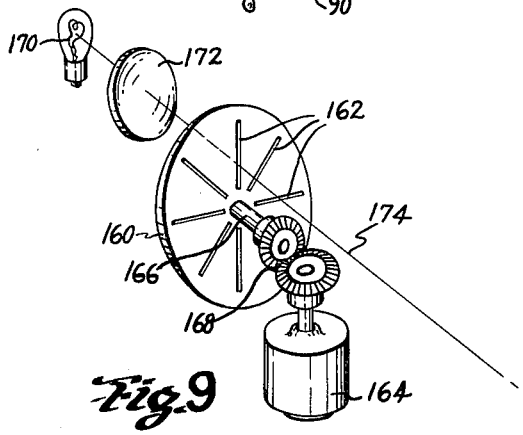

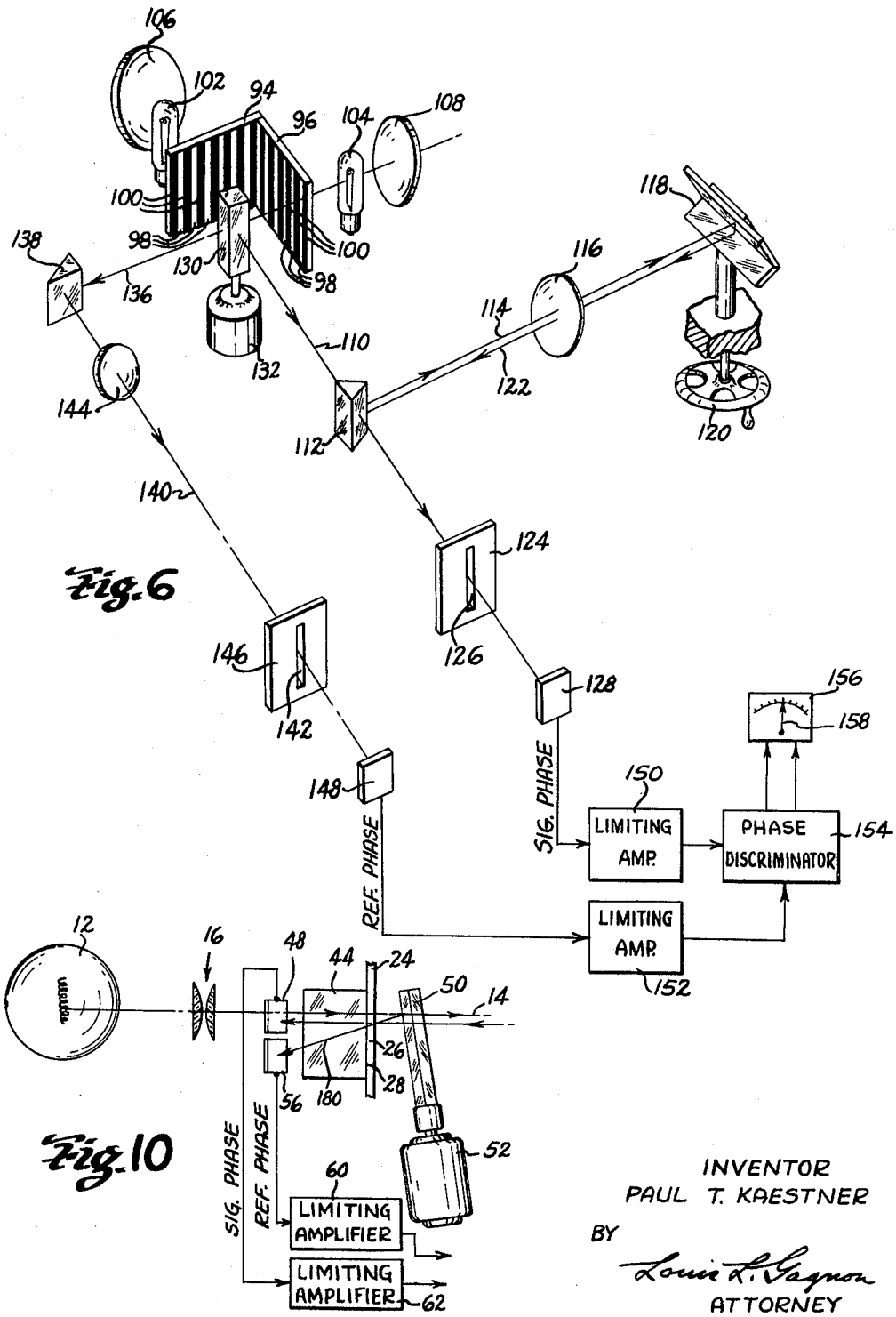

_United States Patent Office_

3,218,913
Patented Nov. 23, 1965

3,218,913
**METHOD AND APPARATUS FOR ELECTRO-OPTI-
CALLY ALIGNING A REMOTE OBJECT**
Paul T. Kaestner, Pittsburgh, Pa., assignor to American
Optical Company, Southbridge, Mass., a voluntary
association of Massachusetts
Filed June 10, 1960, Ser. No. 35,275
7 Claims. (Cl. 88—14)

This invention relates to aligning devices and methods for establishing desired conditions of alignment of objects under test and has particular reference to improvements in electro-optical autocollimating devices and methods of producing autocollimation.

A principal object of the present invention is to provide novel and improved means and method by which desired conditions of relative alignment between selected objects may be quickly, efficiently and accurately attained.

Another object is to provide novel and improved autocollimating devices and methods of accomplishing autocollimation.

Another object is to provide an improved autocollimating device adapted to automatically establish desired conditions of alignment of an object relative to an optical sight line produced by said device and/or to indicate requirements for bringing about said conditions of alignment.

Another object is to provide novel means and method for electro-optically producing orthogonal alignment of a target relative to an optical sight line established by said means.

A further object is to provide in a device of the above character, means for establishing an optical sight line and directing light therealong to an object adapted to return at least a substantial portion of said light along a path generally in the direction of said sight line, means to introduce characteristic changes in said reflected light in accordance with differences in the aligned relationship of said path and sight line, means adapted to receive and convert said reflected light into an electrical signal characterized in accordance with the characteristics of said reflected light, means to produce a standard electrical reference signal and means to interpret differences between said signals from which a desired alignment of the path of said reflected light relative to said sight line may be accomplished.

A still further object is to provide autocollimating devices of the above character which are unique as to their simplicity, economy of construction and extreme precision of operation.

Other objects and advantages of the invention will become apparent from the following description when taken in conjunction with the accompanying drawings in which:

FIG. 1 is a plan view illustrating one form of the invention wherein the general arrangement of the basic elements embodied therein are shown schematically;

FIG. 2 is a cross-sectional view taken substantially along line 2—2 looking in the direction indicated by the arrows and further showing, by block diagram, an electrical circuit in operatively connected relation with certain of the elements of the particular illustrated form of the invention;

FIGS. 3, 4, and 5 are diagrammatic illustrations of the effects of diffraction produced upon light rays passing through one of the elements incorporated in certain of the illustrated devices of the invention;

FIG. 6 is a schematic illustration of an alternate form of the invention;

FIGS. 7 and 8 are illustrations of different modifications of the invention which are applicable to the various illustrated forms thereof;

FIG. 9 is an illustration of a still further modified form of the invention; and FIG. 10 is a diagrammatic illustration of a modified form of the apparatus shown in FIGS. 1 and 2.

Referring more particularly to the drawings wherein a device 10 representing one form of the invention is shown schematically in FIGS. 1 and 2, it will be seen that said device embodies a light source 12 and means to direct light from said source along a predetermined axis to establish an optical sight line 14. The means for establishing the sight line 14 comprises a condenser lens assembly 16 and light-reflecting prisms 18 and 20. A pair of knife-edged light occluders 22 and 24, each having a straight knife edge 26, are positioned in a common plane substantially normal to and passing through the axis defined by the sight line 14 with their respective knife edges 26 in relatively closely spaced relation to each other to effectively provide a relatively narrow vertically extending light slit having one side thereof centered at the dividing line 28 between the reflecting prisms 20 and 44 which is centered upon the sight line 14 and having its other side defined by the knife edge 26 of occluder 22. Light from the source 12 is condensed by the lens assembly 16 onto the slit and is directed by the reflecting prisms outwardly therethrough along the sight line 14 and through a conventional light collimating objective 30 to a target 32 which is to be horizontally aligned in precise right angular relation with the sight line 14 as will be described in greater detail hereinafter.

It is pointed out that because of the fact that FIG. 1 has been described hereinabove as being a plan view of the device 10, the term "vertical" will refer to directions normal to the plane of the sheet of drawings in FIG. 1 and the use of the term "horizontal" when referring to FIG. 1 will mean directions parallel to the plane of the sheet of drawings. However, it will become apparent hereinafter that the device 10 may be used to provide for a vertical orthogonal alignment of a target such as 32 relative to the sight line 14 simply by considering FIG. 1 to be a side elevational view wherein the apparatus shown and described hereinabove would be rotated about the sight line 14 to a position 90° from that shown and described.

Referring once again to FIG. 1 and considering the same to be a top plan view of the device 10, the target 32 has been selected, for purposes of illustration, to embody a retro-reflective mirror 34 which is insensitive to differences in elevation and will, when considering its light reflecting characteristics in the vertical meridian, inherently return a beam of light striking the same along an axis parallel to the axis of the incoming light regardless of its vertical angular adjustment. The mirror 34 is provided with a suitable mount 36 which, by means of a connecting shaft 38 and handwheel 40, can be rotated to adjust the mirror horizontally as indicated by the arrow 42, FIG. 1.

Assuming that the mirror 34 is horizontally aligned in precise normal relation to the sight line 14, light projected along the sight line 14 to the mirror 34 will be reflected thereby and returned, parallel to said line 14 back to the dividing line 28. Similarly that portion of the illuminated slit off the center of the sight line 14 will be reimaged at a slit opening defined by the dividing line 28 and having its other side defined by the knife edge 26 of occluder 24 to be received by a light reflecting element preferably in the form of a prism 44. The prism 44 will then redirect said returning light generally in the direction indicated diagrammatically by the line 46 to a photo-electric element 48 whose purpose and function is to convert the returning light into an electrical signal from which an indication of the condition of alignment of the mirror 34 relative to the sight line 14 can be determined in a manner to be described in detail hereinafter.

In order to render the photoelectric element 48 capable of producing an interpretable electrical signal for the above-mentioned purpose, a scanning element in the form of an elongated rectangular prism 50 is positioned adjacent the slit 28 at the side thereof opposite to the light deflecting prisms 20 and 44. The scanning prism 50 is so positioned as to cause its axis to intersect the sight line 14 while being disposed parallel to the slit 28. As can be seen more clearly in FIG. 2, the prism 50 is preferably mounted endwise directly on the shaft of a constant speed drive motor 52 to avoid the occurrence of vibrations which might ordinarily result from drive arrangements embodying gearing.

By rotation of the prism 50, a scanning of the illuminated slit 28 is produced which causes an image of the slit 28 to effectively continuously move laterally at a rate controlled in accordance with the rate of scanning or rotation of the prism 50. In FIGS. 3–5 the effect of this lateral scanning is diagrammatically illustrated wherein the prism 50 is shown as being rotated counterclockwise, it being understood that clockwise rotation of the prism will produce a similar result. With the prism 50 at the rotated position shown in FIG. 3, the illuminated image of the slit defined by the line 28 and knife edge 26 of occluder 22 will, upon entering the prism 50, be deflected to one side of the sight line 14 as shown by the arrow 54. Continued counterclockwise rotation of the prism 50 will then cause the image, represented by arrow 54, to move toward the sight line 14 to the point where it will pass directly along said sight line 14 as shown in FIG. 4 when a side of the prism 50 is disposed normal to said sight line. Further counterclockwise rotation of the prism 50 will cause continued movement of the image of the slit laterally away from the sight line 14 at the opposite side thereof as shown in FIG. 5. Thus, it can be seen that continuous rotation of the prism 50 will produce a repeated scanning of the image of the slit laterally across the sight line 14 and thereby cause the collimated light which is impinging on the retro-reflective mirrors 34 to change its angle of incidence as a function of the apparent motion of the illuminated slit of light at a pulse rate or frequency of intermittence controlled in accordance with the rate of rotation of the prism 50.

The reflected collimated light returning to the objective 30 is therefore angularly displaced in the reverse sense since the angle of reflection is equal and opposite to the angle of incidence. The moving slit image passes over the slit aperture formed by the knife edge 26 of occluder 24 and the dividing line 28 and impinges upon the photoelectric element 48 in the manner outlined hereinabove to excite the element 48 causing the same to produce an electric signal which pulsates or alternates at a frequency precontrolled in accordance with the rate of scanning of the image of the slit 28. It is pointed out, however, that the intermittent frequency of the light impinging upon the photoelectric element 48 is twice that of the scanning frequency of the light initially emitted by the prism 50 along the sight line 14. This is the result of the light of the slit image passing through the rotating prism 50 a second time when reflected back by the mirror 34 through the slit defined by line 28 and knife edge 26 of occluder 24.

It is pointed out that the photoelectric element 48 may embody any one of the various conventional photosensitive devices which are well known to the art and so characterized as to convert light energy into electrical energy. It should also be understood that while the scanning prism 50 has been shown as being rectangular, it may be of any other desired cross-sectional shape. The rate of scanning will, of course, be relative to the shape of the prism and the speed at which it is rotated.

With the horizontal meridian of the target mirror 34 disposed in perfect right angular relation with the sight line 14, the scanned slit image reflected back from mirror 34 results in intermittent light pulses across the slit defined by line 28 and knife edge 26 of occluder 24 and bears a fixed relationship relative to the corresponding instantaneous position of the scanning prism 50. However, when the horizontal meridian of the mirror 34 is disposed at angles other than normal to the sight line 14, the reflected scanned light from the mirror 34, being deflected laterally relative to the sight line will, upon returning through the slit be phase shifted an amount in accordance with the deviation of said horizontal meridian of the mirror from said right angularly aligned position relative to said sight line 14.

Since the electrical signal produced by the photoelectric element 48 is, as stated above, characterized in accordance with the particular characteristics of the light impinging thereupon, its frequency and phase will be of the same relation as that of the intermittent light impinging thereupon and consequently the electrical signal will be phase shifted by the same amount as the phase shift produced in the intermittent light. It can now be seen that by detecting and determining the extent of phase shifting of the electrical signal produced by the element 48 one can determine the condition of alignment of the mirror 34 relative to the sight line 14 and thereby institute measures to bring about a desired alignment of the mirror 34 relative to the sight line 14.

Referring more particularly to FIG. 2, it will be seen that a second photoelectric element 56 has been provided as reference means for determining the extent of phase shifting of the signal produced by the photoelectric element 48. The second photoelectric element 56 is similar in all respects to the element 48 and is positioned away from the line of sight 14 in such manner as to prevent light from the mirror 34 from impinging thereupon while permitting light passing from the source 12 through the condensing lenses 16, prisms 18–20, slit defined by line 28 and knife edge 26 of occluder 22 and prism 50 to be redirected by a fixed mirror 58 back through the prism 50, slit defined by line 28 and knife edge 26 of occluder 24 and prism 44 onto the photoelectric element 56. In so doing, a portion of the illuminated image of the slit which passes through the scanning prism 50 is redirected by the mirror 58 back through the scanning prism 50 to double its frequency of intermittence and thereby impinge upon the photoelectric element 56 at the same frequency as that of the reflected light impinging simultaneously upon the photoelectric element 48 and also of the same phase relationship as the light impinging upon the element 48 when the mirror 34 is perfectly orthogonal with the sight line 14. It can then be seen that the frequency of the signals produced by the elements 48 and 56 will always be of the same frequency and the phase of the signal from element 56 will set a standard or reference while the phase of the signal produced by the element 48 will shift in accordance with the condition of horizontal alignment of the mirror 34 relative to the sight line 14.

Indication of the condition of horizontal alignment of the mirror 34 can then be determined by phase discriminating means adapted to interpret phase differences between the reference signal from the element 56 and the signal from the element 48.

In FIG. 2 there is shown by block diagram a phase discriminating circuit wherein the signals from each of the elements 48 and 56 are directed through limiting amplifiers 60 and 62 respectively of any conventional nature preferably each embodying automatic gain control and tuned circuits to avoid interference and inaccurate indications which might result from ambient frequencies generated externally of the device 10. From the amplifiers 60 and 62 which boost the power of the signals, said signals are fed (see FIG. 2) into a phase discriminator 64 which may also be of any conventional design, and which is adapted to indicate upon a suitable meter 66, by deflection of its pointer 68, the extent of the difference in phase between the signals from the elements 48 and 56. A zero position 70 is provided on the meter 66 to indicate zero phase difference between said signals when the mirror 34 of the target member 32 is in perfect orthogonal relation with the sight line 14. Right or left-hand deflections of the pointer which result from different directions of phase shift in the signals from the element 48 will indicate a requirement for either right or left-hand adjustment of the target 34, as needed, to properly align the mirror 34. The degree or extent of orthogonal errors can also be determined by proper calibration of the measuring circuit and indicated by scale markings on the meter.

From the above, it can be seen that the meter 66 will give an indication of orthogonal errors of alignment of the target mirror 34 and by rotatably adjusting the target 32 horizontally by means of a handwheel 40 or the like to zero the meter 66, one can accomplish a precise orthogonal alignment of the target relative to the sight line 14.

It should be understood that a plane or flat mirror surface may be used to replace the retro-reflective mirror 34 if it is so desired provided that the vertical medidian of the plane mirror is disposed substantially normal to the sight line 14 at all times so that reflected light therefrom will be directed to the photoelectric element 48.

If it is desired to provide for automatic adjustment of the target mirror 34 relative to the sight line 14, an arrangement such as shown in FIG. 7 may be used to replace the meter 66 and handwheel 40 of FIGS. 1 and 2. In FIG. 7, a target 72 which is similar in all respects to the target 32 is provided with a phase sensitive motor 74 of a type well known to the art and the motor is, in turn, electrically connected to a phase detector 76 into which is fed a signal represented by arrow 78 from a standard or reference photoelectric element such as 56 (FIG. 1) and a second signal 80 from a detector photoelectric element such as 48 (FIG. 1). With such an arrangement, the motor 74 will respond by rotation of its shaft 82 in a direction such as to properly align the target 72 in accordance with its sensing of the extent and magnitude of electrical phase shift between the two signals 78 and 80.

It is also pointed out that with the basic elements of the device 10 mounted in a suitable housing 84 such as shown in FIG. 8, the device 10 may be adjusted relative to a fixed target 86 by providing a swivel mount 88 for the housing 84. By means of a handwheel 90, adjustment of the housing 84 can be made in accordance with requirements indicated by the meter 66 to align the sight line 92 of the apparatus in the housing 84 in perfect orthogonal relation with the target 86. Furthermore, automatic alignment of the sight line 92 may be accomplished by replacing the handwheel 90 with a phase sensitive motor such as the motor 74 (FIG. 7) wherein the electrical signals from the photoelectric elements 48 and 56 would be fed into the phase sensitive motor rather than to a meter.

A modified form of the invention is shown schematically in FIG. 6 wherein a pair of grid members 94 and 96 each having alternate vertically disposed transparent and opaque areas 98 and 100 are provided. The planes of each of said grid members 94 and 96 are disposed vertically and at right angles to each other and the transparent areas 98 thereof are illuminated by the respective light sources 102 and 104 having reflectors 106 and 108 therebehind which function to condense light from the said sources onto the respective grids 94 and 96. An image of the grid 94 is thereby projected along an axis 110 to a beam splitting prism 112 which redirects a substantial portion of the light of said image of the grid 94 away from the axis 110 along a normally related axis which defines the sight line 114 of the device of FIG. 6. The image of the grid 94 then passes through a collimating objective 116 to a retro-reflective target mirror 118 which, for purposes of illustration, is identical in all respects to the target 32 (FIG. 1) and is provided with a handwheel 120 for producing horizontal rotary adjustment of the target mirror 118. With the target mirror 118 aligned perfectly orthogonal with the sight line 114, the image of the grid 94 will be reflected by the target mirror 118 back to the prism 112 along a line 122 parallel to the sight line 114 and will be redirected by the prism 112 again along the axis 110 in a direction away from the grid 94. A light occluder 124 having a transparent slit 126 therein is placed in the optical path of the light reflected from the target mirror 118 and a photoelectric element 128 is placed in such position as to receive only light passing through the slit 126. The slit 126 is aligned parallel to the transparent areas 98 of the grid 94 and is centered upon the axis 110.

In order to provide means for causing the photoelectric element to produce an intermittent electrical signal from which determination of the condition of horizontal alignment of the target 118 relative to the sight line 114 may be determined, an elongated axially rotatable prism 130 is positioned with its axis centered upon the axis 110 and disposed parallel to the grid areas 98 and 100. Rotation of the prism 130 about its axis by means of a constant speed drive motor 132 will cause a lateral scanning of the grid areas 98 and 100 in the manner described hereinabove with relation to FIGS. 3–4. This scanning of the grid 94 will produce an effective lateral movement of the light and dark grid areas across the axis 110 and consequently result in a scanning of the slit 126 by said light and dark areas at a frequency rate determined by the rate of rotation of the prism 130. The scanning of the slit 126 will then result in the effect that light from the image of the grid 94 will intermittently pass through the slit 126 and impinge upon the photoelectric element 128 causing the same to produce an intermittent or alternating electrical signal of a frequency set in accordance with the rate at which the rotating prism 130 scans the slit 126.

A second signal to be used as a standard or reference for comparison with the signal produced by the photoelectric element 128 is provided by directing light from the source 104 through the grid 96 and the rotating prism 130 along an axis 136 normal to the axis 110 to a prism 138 or the like which directs said light along a second axis 140 paralleling the axis 110. The light from the source 104 then passes through a suitable conventional reimaging lens or the like 144 which produces an image of the transparent areas 98 of the grid 96 upon a light-occluding member 146 having a transparent slit 142 therein. The member 142 is identical in construction and function to the above-described similar member 124.

Since the above-mentioned scanning of the light passing through the grid 94 and the scanning of the light passing through the grid 96 is accomplished by the same scanning prism 130, it can be seen that the frequencies of scanning of the images of said grids 94 and 96 across their respective slits 126 and 142 are identical and the intermittent light impinging upon a second photoelectric element 148 will cause said element 148 to produce an electric signal of the same frequency as the signal produced by the element 128. However, the phase relationships of the two signals will only be identical when the target mirror is perfectly orthogonal with the sight line 114. When the path 122 of the reflected light from the target mirror is non-parallel to the sight line 114 as a result of the mirror 118 being horizontally disposed at angles other than normal to said sight line, the phase of the intermittent light passing through the slit 126 will be shifted in accordance with the extent of horizontal misalignment of the mirror 118 and consequently the electrical phase of the signal produced by the photoelectric element 128 will be shifted accordingly. This creates a difference in the phase relationship of the signals from elements 128 and 148 wherein the signal from the photoelectric element 148 is standard and unaffected by conditions of alignment of the target mirror 118.

From the above, it can be seen that an indication of the extent and direction of horizontal misalignment of the target mirror 118 can be determined by comparison of the phase characteristics of the signals from the elements 128 and 148. This may be accomplished precisely as shown and described hereinabove with relation to FIG. 2 by the provision of a phase discriminating circuit embodying limiting amplifiers 150 and 152, a phase discriminator 154 and a meter 156 wherein all parts of the said circuit are identical in function to the respective similar parts 60, 62, 64 and 66 of FIG. 2.

Adjustment of the target mirror 118 for proper alignment thereof relative to the sight line 114 is made by operation of the handwheel 120 which is rotated an amount and in a direction in accordance with the requirements for said target 118 alignment as indicated by the pointer 158 of the meter 156.

It is pointed out that the grids 94 and 96 of FIG. 6 may each be replaced by a single light slit similar to the slit defined by the knife edges 26 of the occluders 22 and 24 shown in FIGS. 1 and 2 if it is so desired.

Also it should be understood that while the device of FIG. 6 has been shown and described as being adapted to produce horizontal alignment of the target 118 relative to the sight line 114, the entire showing of FIG. 6 may be turned 90° about the sight line 114 to operate as means for vertically aligning a target such as 118. Again, a flat mirror may replace the mirror 118 as an alternate type of target provided the vertical meridian of the flat mirror is prealigned relatively accurately normal to the sight line 114 and is retained in said right angular relation to the sight line during operation of the device.

Referring again to FIGS. 7 and 8, it is pointed out that the arrangements shown therein may be incorporated in the device of FIG. 6. That is, the phase sensitive motor 74 may be used to replace the handwheel 120 or by suitably mounting the elements of FIG. 6 in a housing similar to 84 (see FIG. 8) an aligning procedure such as described hereinabove with relation to FIG. 8 may be accomplished with the device of FIG. 6.

In FIG. 9 there is shown another modification of the invention wherein a rotatable slotted disc 160 may be used for forming the intermittent light patterns described hereinabove. The disc 160 being formed of opaque material is provided with equally spaced radial slits 162 and is rotated at a predetermined rate by means of a constant speed motor 164 which may be directly connected to the shaft 166 of the disc 160 or operatively coupled thereto by a gearing arrangement 168 as shown. By providing a light source 170 at one side of the disc 160 and a light condensing lens element or the like 172 adapted to condense light from the source 170 upon the slits 162 along an axis 174, rotation of the disc 160 will produce an intermittent laterally moving light pattern which can be utilized to bring about a desired alignment of a target such as 118 (FIG. 6) when the intermittent light pattern is projected onto a stationary slit such as 126 (FIG. 6). Thus, it can be seen that by replacing the grid 94 and rotatable prism 130 of FIG. 6 with the arrangement of FIG. 9, the system of FIG. 6 can be operated to produce the results of alignment of the target 118 which have been described in detail hereinabove. In order to produce a standard or reference signal by the scanning of the slit 142 (FIG. 6) the grid 96 would also be replaced by a rotatable disc which is identical to the disc 160 and rotated in the same phase relation.

It should be clear that various modifications of the above-described different aligning devices of FIGS. 1, 2 and 6 may be made to incorporate the use of the light scanning arrangement of FIG. 9 as replacement means for the rotary prisms 50 (FIGS. 1 and 2) or 130 (FIG. 6).

FIG. 10 illustrates a further modification of the invention wherein the same arrangement of elements shown in FIGS. 1 and 2 is employed with the exception that the scanning prism 50 is inclined at an angle relative to the direction of the dividing line 28 between the reflecting prisms 20 and 44, rather than parallel thereto as shown in FIGS. 1 and 2. This inclination of the prism 50 has no adverse effect on the light signal which is transmitted to and received from the retro-reflective target 34 and has the advantage that light which is reflected from the surfaces of the prism 50 is directed away from the line of sight 14 and is thereby prevented from interfering with the above-mentioned light signal which is directed to and from the target 34. With the arrangement of FIG. 10, the reflected light from the surfaces of the prism 50 can be used to produce the reference signal thereby superseding the use of the mirror 58 of FIGS. 1 and 2.

In this respect, it can be seen in FIG. 10 that light indicated diagrammatically by the arrow 180 which is reflected from the rotating prism 50 is directed into the reflecting prism 44 through the above-described light slit defined by the line 28 and edge 26 of the occluder 24 and by reflection through the prism 44, said reflected light 180 impinges upon the photoelectric element 56 which converts the same into an electrical reference signal. In this case, the reference signal produced by the photoelectric element 56 will be half the frequency of the signal produced by the photoelectric element 48. This is compensated for, however, by tuning the amplifier 60 to operate on a harmonic of the reference signal so that, at the output of the amplifiers 60 and 62, both signals will be of the same frequency.

It is pointed out that in all cases, the various forms of the invention operate on variable phase shifted signals independent of amplitudes.

From the foregoing, it will be seen that simple, efficient and economical means and method have been provided for accomplishing all of the objects and advantages of the invention as expressed in the accompanying claims and the invention is not to be limited to the exact matters shown and described as only the preferred matters have been given by way of illustration.

Having described my invention, I claim:

1. A device of the character described comprising an optical system having an established optical sight line, a source of light positioned on said sight line, fixed light occluding means having an elongated transparent slit disposed substantially perpendicularly to and centered on said sight line, means for directing light from said source onto a first side of said occluding means to illuminate said slit thereby causing a narrow beam of light to be projected away from the opposite side of said occluding means along said sight line, refracting means for scanning said beam of light across said line of sight at a predetermined frequency while maintaining the axis of said beam parallel to said line of sight, a light collimating objective element centered on said sight line for receiving said beam of light and for directing the same to a remote object whose orientation relative to said sight line is to be determined, said object being characterized to return at least a portion of said beam of light reversely along a path having a direction indicative of the orientation of said object relative to said sight line, said returned beam of light being reversely directed through said objective element, light refracting means and said slit and caused by said light refracting means to scan said slit and be phase modulated in accordance with the relative angular relationship of said sight line and path of its return from said object, photoelectric means adjacent said first side of said occluding means, means to direct said returned beam of light onto said photoelectric means, said photoelectric means being characterized to produce an electrical signal which is frequency and phase characterized in accordance with the frequency of scanning and phase modulation of said beam of light received thereby, means for producing a similar electrical reference signal of a frequency equal to that produced by said photoelectric means and which is phase modulated so as to match that of a signal which would be produced by said photoelectric means when said beam of light received thereby is returned from said object in a direction parallel to said sight line and means for receiving said signals and interpreting characteristic phase differences therebetween from which a determination of the orientation of said object relative to said sight line is arrived at.

2. A device of the character described comprising an optical projecting system having an optical axis defining an established optical sight line, light occluding means embodying an elongated transparent slit disposed substantially prependicularly to and centered on said sight line, means for illuminating a first side of said occluding means to project a narrow beam of light along said sight line away from said occluding means, a rotatable transparent light refracting member positioned to receive said beam of light, means to rotate said light refracting member to cause said beam of light to scan across said sight line, an object to receive said light, a light collimating objective element centered upon said sight line for receiving said beam of light and for directing the same onto said object whose orientation relative to said sight line is to be determined, means on said object to redirect at least a portion of said beam of light reversely through said objective element, light refracting means and slit to form a pulse of light the phase of which is representative to the orientation of said object relative to said sight line, photoelectric means adjacent said first side of said occluding means adapted to receive said reversely directed portion of light and produce an electrical signal which is characterized in frequency and phase in accordance with the rate of scanning and phase of said reversely directed portion of light, means for producing a standard reference signal of predetermined frequency and phase and means for interpreting existing phase differences between said electrical signals for determining the orientation of said object relative to said sight line.

3. A device of the character described comprising an optical system having an established optical sight line, a source of light positioned on said sight line, light occluding means having an elongated transparent slit disposed substantially perpendicularly to and centered on said sight line, means for directing light from said source onto a first side of said occluding means to illuminate said slit and cause a first narrow beam of light to be projected away from the opposite side of said occluding means along said sight line while simultaneously causing a second similar narrow beam of light to be projected along an axis separate from said sight line, transparent rotatable light refracting means intercepting said sight line and axis, means for rotating said light refracting means at a precontrolled rate to cause said first and second beams of light to simultaneously repeatedly scan across said sight line and axis respectively at a predetermined frequency, an optical objective element centered on said sight line for receiving said first beam of light and for directing the same to a remote object whose orientation relative to said sight line is to be determined, said object being characterized to return at least a portion of said first beam of light reversely along a path having a direction indicative of the orientation of said object relative to said sight line, said returned first beam of light being directed through said optical objective element, light refracting means and slit thereby being caused by said light refracting means to scan scross said slit at double the frequency originally imparted thereto as directed toward said object, said returned first beam of light further being caused to be phase modulated in accordance with the relative angular relationship of said sight line and path of its return from said object, first photoelectric means adjacent said first side of said occluding means, means to direct said returned first beam of light onto said first photoelectric means, second photoelectric means, means adapted to receive and redirect said second beam of light reversely through said light refracting means and slit onto said second photoelectric means along a fixed path, said second beam of light received by said second photoelectric means being caused by said light refracting means to scan said slit before impinging upon said second photoelectric means at a rate equal to that of said returned first beam of light from said object, said first and second photoelectric means being characterized to convert respective beams of light received thereby into first and second electrical signals each characterized in accordance with the phase relationships of beams of light respectively received thereby and means for receiving said first and second electrical signals and for interpreting characteristic phase differences therebetween to determine the angular relationship of said sight line and path along which said first beam of light is returned from said object.

4. A device of the character described comprising a light source disposed along an optical axis preselected to define an optical sight line, light occluding means embodying an elongated transparent slit disposed perpendicularly to and centered on said sight line, means for condensing light from said source onto one side of said occluding means to form a narrow beam of light having a first portion thereof directed away from said occluding means along said sight line and a second portion directed along an axis apart from said sight line, a rotatable light refracting member adjacent said slit at the opposite side thereof through which said narrow beam of light passes, means to rotate said light refracting member at a precontrolled rate to cause said first portion of said narrow beam of light to scan across said sight line and said second portion of said narrow beam of light to simultaneously scan across said axis apart from said sight line, a fixed light reflecting member arranged to receive said second portion of said narrow beam of light and direct the same reversely through said light refracting member and slit, a first photoelectric member adapted to receive said reversely directed second portion of said narrow beam of light, an objective lens element centered upon said sight line through which said first portion of said narrow beam of light is directed to a target adapted to return said first portion of said narrow beam of light generally in the direction of said sight line reversely along a path also through said light refracting member and slit, second photoelectric means adapted to receive said reversely directed first portion of said narrow beam of light and convert the same into a second electrical signal, means for receiving said first and second signals and interpreting characteristic differences therebetween and means for adjusting the relative alignment of said sight line and path in accordance with the interpretation of said differences between said signals to bring about a desired condition of relative alignment of said sight line and path.

5. A device of the character described having an established optical sight line comprising first and second light modulating members each forming at least one narrow beam of light when illuminated, means for separately illuminating said light modulating members, means for directing said narrow beam of light from said first member along said sight line to an object, said object being adapted to return at least a portion of narrow beam of light reversely along a path generally in the direction of said sight line, means for directing said narrow beam of light from said second member along an axis separate from said sight line, a rotatable light refracting member for causing said beams of light from said first and second members to simultaneously scan laterally respectively across said path and axis at equal rates and at a frequency precontrolled in accordance with the rate of said scanning, means for receiving and converting said beam of light passing along said path into a first electrical signal, means for receiving and converting said beam of light passing along said axis into a second reference electrical signal, said signals being equally frequency modulated in accordance with the frequency of scanning produced by said refracting member and said first signal being phase modulated differently than said second signal in accordance with differences in the relative alignment of said sight line and path from a condition of parallelism, means to interpret differences in the phase characteristics of said signals and means to adjust said object and device, one relative to another, to bring about a desired aligned relationship of said sight line and path in accordance with the phase differences of said first and second signals.

6. The method of determining a condition of alignment of an object adapted to receive and redirect light reversely relative to an established optical sight line comprising projecting a narrow beam of light through light modulating means along said established optical sight line to said object for redirection of at least a portion of said light by said object reversely through said same light modulating means along a path generally in the direction of said sight line to cause said light modulating means to modulate said projected and redirected light both in such manner as to render the projected light and redirected light intermittent each at a precontrolled frequency and simultaneously caused to scan transversely in one direction across said sight line and said path, the respective phases of said redirected intermittent light scanning across said path and said intermittent projected light scanning across said sight line being identical when said path and sight line are parallel and being different when said path and sight line are non-parallel, receiving and converting the energy of said redirected intermittent light passing along said path and through said modulating means into a first electrical signal having frequency and phase characteristics corresponding to those of said redirected intermittent light, producing a second standard electrical signal for reference purposes having the same frequency and phase characteristics as would be produced by said first signal when said sight line and path are parallel, comparing said first and second signals to determine existing differences in the phase relationships thereof when said path and sight line are non-parallel and determining from such phase differences of said signals the extent of deviation of said path and sight line from parallelism.

7. The method of determining a condition of alignment of an object adapted to receive and redirect light reversely relative to an established optical sight line comprising projecting a first portion of light through light modulating means along an established optical sight line to said object for redirection of at least a part of said first portion of light reversely through the same light modulating means and simultaneously projecting a second portion of light through said same light modulating means along a given path separate from said sight line and redirecting at least a part of said second portion of light reversely through said light modulating means to cause said light modulating means to modulate all light directed therethrough in such manner as to render the light intermittent at a precontrolled frequency and simultaneously caused to scan transversely across said sight line and path respectively in substantially identical phase relationships when projected in a direction away from said modulating means, causing said redirected second portion of light along said path to pass reversely through said light modulating means with the same phase relationship as when directed away therefrom and causing said first portion of light when redirected parallel to said sight line reversely from said object through said light modulating means to be correspondingly phase modulated while being differently phase modulated when redirected from said object in a direction other than parallel to said sight line, the extent of said difference in phase modulation indicating the extent of deviation of said redirected first portion of light from said sight line, converting said first portion of light after being reversely directed through said light modulating means into a first electrical signal having frequency and phase characteristics according to those of said first portion of light, converting said second portion of light after being reversely directed through said light modulating means into a second electrical signal having frequency and phase characteristics according to those of said second portion of light, comparing said first and second electrical signals to determine existing differences in the phase relationships thereof and determining from such phase differences of said signals the extent of deviation from parallelism of said directed and redirected first portion of light.

References Cited by the Examiner
UNITED STATES PATENTS

| 2,773,413 | 12/1956 | Schade | 88—14 |
| 2,950,428 | 8/1960 | Gievers | 88—14 X |

FOREIGN PATENTS 281,171  6/1952  Switzerland.

JEWELL H. PEDERSEN, *Primary Examiner.*

EMIL G. ANDERSON, *Examiner.*